(12) United States Patent
Ko et al.

(10) Patent No.: US 6,351,330 B2
(45) Date of Patent: *Feb. 26, 2002

(54) MICROMIRROR DEVICE FOR IMAGE DISPLAY APPARATUS

(75) Inventors: Hee-kwon Ko; Hyung-jae Shin, both of Kyungki-do (KR)

(73) Assignee: Samsung Electronics Co., Ltd., Kyungki-Do (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/283,999

(22) Filed: Apr. 2, 1999

(30) Foreign Application Priority Data

Apr. 10, 1998 (KR) .............................. 98-12865

(51) Int. Cl.$^7$ .............................................. G02B 26/08
(52) U.S. Cl. ........................ 359/298; 359/224; 359/291
(58) Field of Search ................................ 359/224, 290, 359/291, 292, 298

(56) References Cited

U.S. PATENT DOCUMENTS

| 5,142,405 A | 8/1992 | Hornbeck ................... 359/226 |
| 5,600,383 A | 2/1997 | Hornbeck ................... 348/771 |
| 5,631,782 A | 5/1997 | Smith et al. ................. 359/871 |
| 5,661,591 A | * 8/1997 | Lin et al. .................... 359/290 |
| 5,699,181 A | 12/1997 | Choi ........................... 359/291 |

FOREIGN PATENT DOCUMENTS

| EP | 0 563 546 | 10/1993 |
| EP | 0 664 470 | 7/1995 |
| EP | 0 754 958 | 1/1997 |
| JP | 7-287177 | 10/1995 |

OTHER PUBLICATIONS

Korean Office Action dated May 28, 2001.

* cited by examiner

Primary Examiner—Georgia Epps
Assistant Examiner—Evelyn A. Lester
(74) Attorney, Agent, or Firm—Sughrue Mion, PLLC

(57) ABSTRACT

A micromirror device for an image display apparatus in which it is possible to drive a mirror by rotation is provided. The micromirror device according to the present invention includes a substrate, a pair of first posts protrusively formed on an upper surface of the substrate and, electrodes formed on the substrate. A supporting plate is supported by the first posts and rotatably arranged using a portion supported by the first posts as a hinge point, a second post is protrusively formed on the supporting plate, and a mirror is supported by the second post for reflecting light incident on one surface thereof, wherein a slope of the mirror can be controlled by an electrostatic attraction between the electrode and the mirror.

38 Claims, 5 Drawing Sheets

MICROMIRROR DEVICE FOR IMAGE DISPLAY APPARATUS

BACKGROUND OF THE INVENTION

1. Field of the Invention

The present invention relates to a micromirror device for an image display apparatus by which it is possible to convert the traveling path of incident light, and more particularly, to a micromirror device for an image display apparatus by which it is possible to convert the traveling path of incident light by rotating a mirror.

2. Description of the Related Art

In general, a micromirror device for an image display apparatus includes a plurality of mirrors installed to be driven by an electrostatic force and reflects incident light at a predetermined angle. The micromirror device is applied to a light scanning apparatus such as an image display apparatus of a projection television, a scanner, a photo copier, and a facsimile machine. In particular, when the micromirror device is used as the image display apparatus, as many mirrors as there are pixels are two-dimensionally arranged and light is reflected by driving the respective mirrors according to a video signal with respect to the respective pixels, thus controlling the brightness.

Referring to FIG. 1, a conventional micromirror device includes a substrate 1, an elastic plate 5 and a mirror 8 separated from each other in a vertical direction with respect to the substrate 1 by first and second posts 3 and 7, and a light shielding plate 6 positioned on the elastic plate 5 around the mirror 8 for shielding the progress of the incident light.

An electrode 2 is formed on the substrate 1. The electrode 2 lifts the mirror 8 by mutual electrostatic attraction between the electrode 2 and the elastic plate 5. The elastic plate 5 is supported by the first post 3 and is located in a predetermined position on the substrate 1. The elastic plate 5 includes a horizontal unit 5a which directly contacts the first post 3 and maintains a horizontal state, and an elastic unit 5b for supporting the second post 7 and lifted in a vertical direction by the mutual electrostatic attraction according to the on and off states of the, electrode 2. The mirror 8 is arranged on the elastic unit 5b by the second post 7 and is lifted in a vertical direction as the elastic unit 5b is lifted. The light shielding plate 6 is installed on the horizontal unit 5a of the elastic plate 5 so as to be arranged around the mirror 6.

The conventional micromirror device having the above structure converts the traveling path of the incident light by the principle shown in FIGS. 2 and 3.

FIG. 2 schematically shows a micromirror device in which there is an electric potential difference between the electrode 2 and the elastic plate 5. As shown in FIG. 2, since the elastic plate 5 is tilted toward the electrode 2 due to the electrostatic attraction, the restoring force of the elastic plate 5 becomes large. The elastic unit 5b falls down to a position in which the restoring force is equal to the electrostatic attraction. Accordingly, the mirror 8 arranged on the elastic unit 5b falls down toward the electrode 2. Since the light shielding plate 6 is positioned on the horizontal unit 5a, the vertical height thereof is maintained. Therefore, the light shielding plate 6 protrudes around the mirror, thus shielding the light L incident on the mirror 8 to be inclined and reflected from a reflection surface of the mirror 8 without letting the light L be incident on a projection lens 10 arranged on a reflection path.

FIG. 3 schematically shows a micromirror device when the electrostatic attraction is removed between the electrode 2 and the elastic plate 5. As shown in FIG. 3, the elastic unit 5b has the same height as that of the horizontal unit 5a due to the restoring force. In this case, the mirror 8 is lifted to have a height equal to the upper end of the light shielding plate 6. Therefore, the light L incident on the mirror 8 to be inclined and reflected from the reflection surface thereof is incident on the projection lens 10 arranged on the light path without the affection of the light shielding plate 6.

The micromirror device operates as described with reference to FIGS. 2 and 3. Accordingly, the brightness of the light facing the projection lens is determined by the respective pixels. Since the brightness is determined by the light shielding in the conventional micromirror device having the above structure, the angle of the incident light should be about 80° or more. Therefore, an optical system such as a projection lens is difficult to arrange. Also, since the light incident on the end of the light shielding plate is diffracted, screen contrast deteriorates due to the light. When such a micromirror device is used for the display apparatus, it is difficult to arrange the heights of a plurality of light shielding plates to be uniform to correspond to all the pixels having a two-dimensional array structure.

SUMMARY OF THE INVENTION

To solve the above problem, it is an objective of the present invention to provide a micromirror device by which it is possible to convert a traveling path of incident light due to the rotation of mirrors by improving the structure of a horizontal supporting plate.

Accordingly, to achieve the above objective, there is provided a micromirror device for an image display apparatus, comprising a substrate, a pair of first posts protrusively formed on an upper surface of the substrate so as to be separated from each other by a predetermined distance, electrodes formed on the substrate, a supporting plate supported by the first posts and rotatably arranged using a portion supported by the first posts as a hinge point, a second post protrusively formed on the supporting plate, and a mirror supported by the second post for reflecting light incident on one surface thereof, wherein a slope of the mirror can be controlled by an electrostatic attraction between the electrode and the mirror.

BRIEF DESCRIPTION OF THE DRAWING(S)

The above objective and advantages of the present invention will become more apparent by describing in detail a preferred embodiment thereof with reference to the attached drawings in which:

FIG. 1 is a schematic perspective view showing a micromirror device for a conventional image display apparatus;

FIGS. 2 and 3 describe the operation of the micromirror device for the conventional image display apparatus;

DESCRIPTION OF THE PREFERRED EMBODIMENTS

Figure 1:
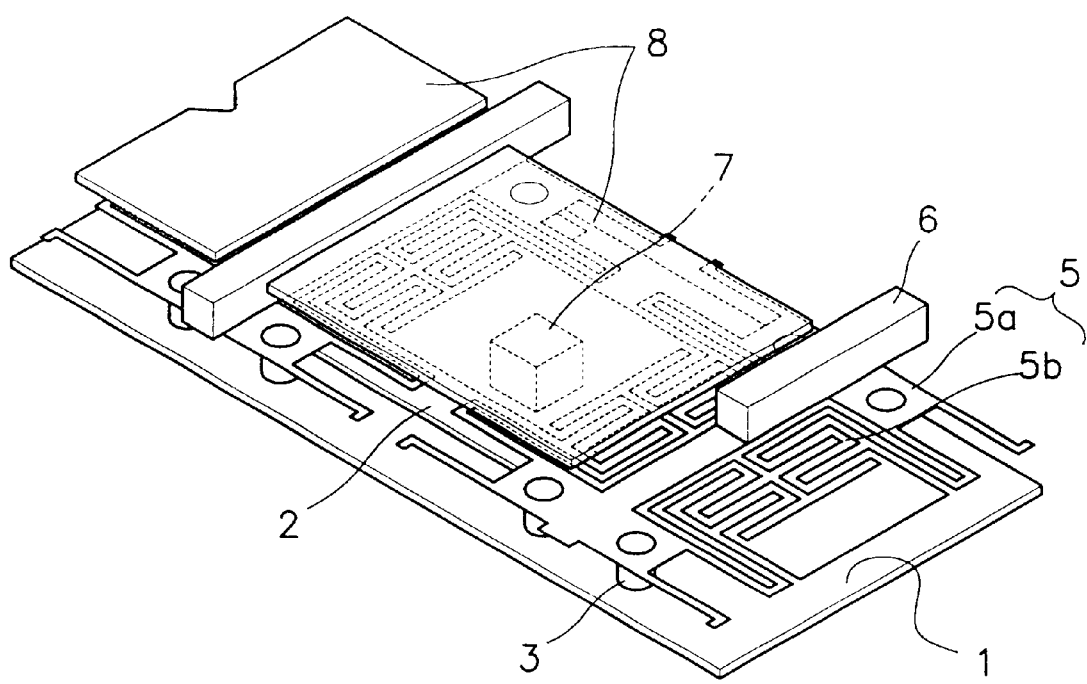
Figure 2:
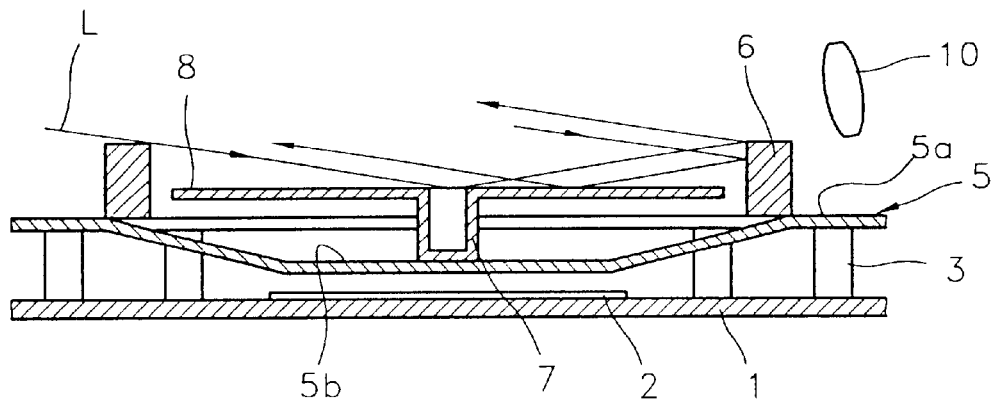
Figure 3:
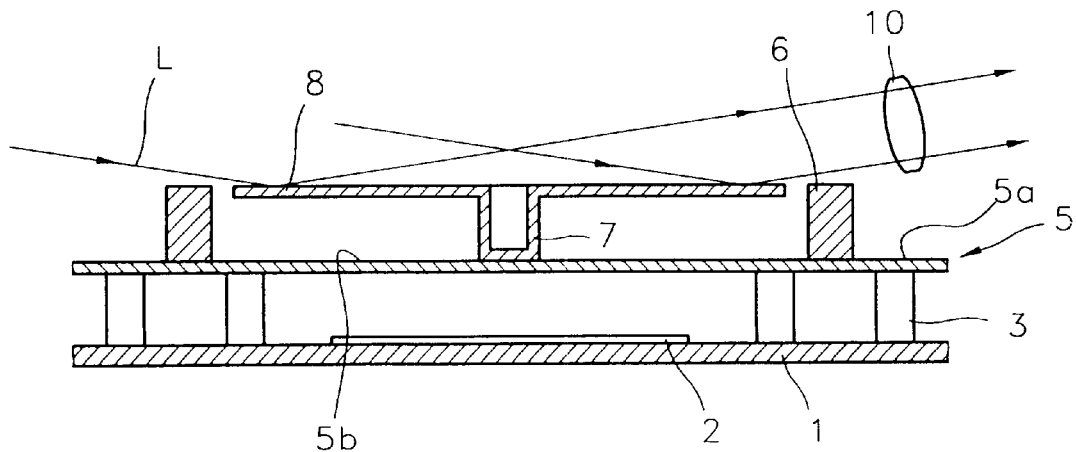
Figure 4:
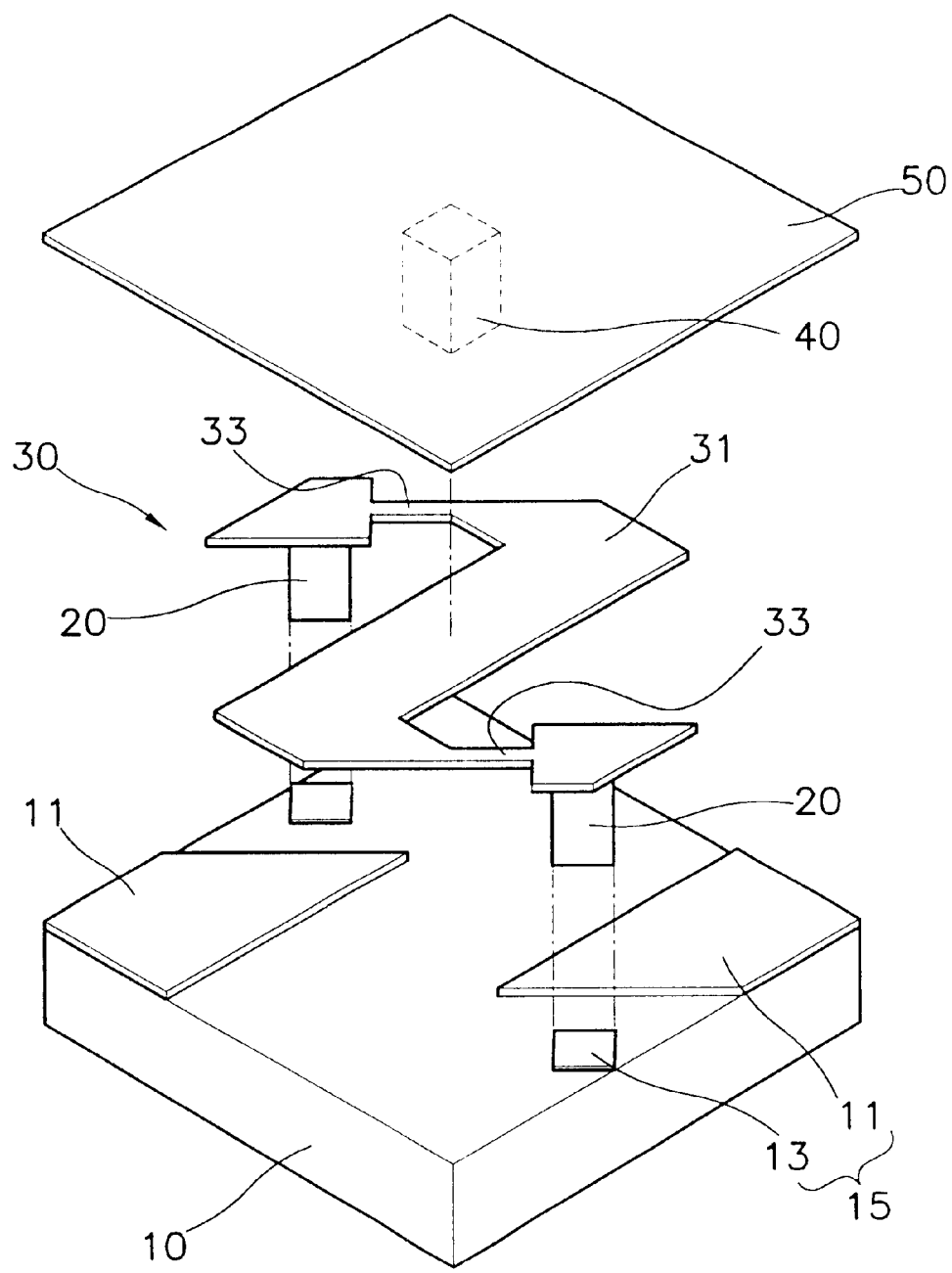
FIG. 4 is a schematic exploded perspective view of a micromirror device for an image display apparatus according to an embodiment of the present invention.
Figure 5:
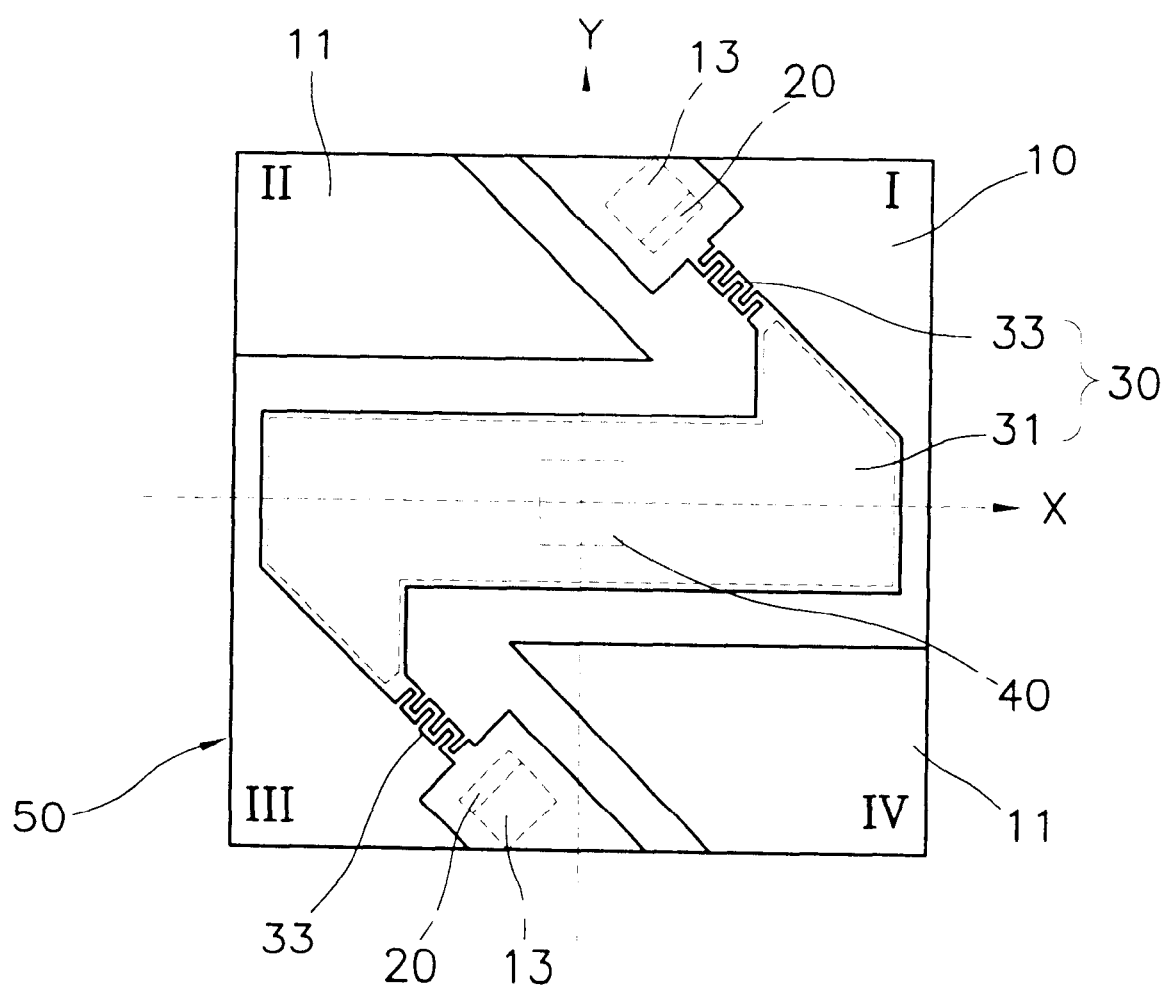
FIG. 5 is a schematic plan view of FIG. 4.

FIG. 4 is a schematic exploded perspective view showing a micromirror device according to an embodiment of the present invention. FIG. 5 is a plan view showing a state in which mirrors are removed from FIG. 4.

As shown in FIGS. 4 and 5, the micromirror device includes a substrate 10, a pair of first posts 20 formed on the substrate 10, an electrode 15 formed on the substrate 10, a supporting plate 30, a second post 40 protrusively formed on the supporting plate 30, and a mirror 50 supported by the second post 40.

The pair of first posts 20 separated from each other by a predetermined distance are protrusively formed to have a predetermined height in a vertical direction with respect to the substrate 10 and supports the supporting plate 30.

The electrode 15 includes a pair of base electrodes 11 arranged on the substrate 10 to be separated from each other by a predetermined distance and a connection electrode 13 formed on the substrate 10 so as to contact one end of the first posts 20 for applying a voltage to the mirror 50. Therefore, a mutual electrostatic attraction is generated between the base electrodes 11 and the mirror 50 according to the on and off states of the electrode 15, thus rotating the mirror 50.

The supporting plate 30 is supported by the pair of first posts 20 and is rotated using a part supported by the first posts 20 as a hinge point. The supporting plate 30 is comprised of a horizontal supporting plate 31 for supporting the second post 40 and a pair of springs 33 for respectively connecting the pair of first posts 20 to both ends of the horizontal supporting plate 31. Here, the horizontal supporting plate 31 is formed to have a predetermined width and a predetermined thickness and is hardly elastically deformed. The pair of springs 33 are elastically deformed due to the mutual electrostatic attraction between the mirror 50 and the base electrodes 11. Therefore, rotation moments having opposite directions are loaded on the respective pair of springs 33 when an electrostatic attraction is generated. Accordingly, the horizontal supporting plate 31 is rotated and the mirror 50 is tilted up and down.

The second post 40 is protrusively formed to have a predetermined height in the middle of the horizontal supporting plate 31 and supports the center of the mirror 50. The tilt angle of the mirror 50 is determined by the electrostatic attraction. Accordingly, the reflection angle of the light incident on the upper surface of the mirror 50 is changed.

An example of the arrangement of the micromirror device will be described with reference to FIG. 5. The plane surface of the mirror 50 is square. The arrangements of the first supports 20, the electrode 15, and the supporting plate 30 are described as follows, in a state in which the mirror 50 is divided into four areas as determined by an X and Y orthogonal axes which cross the center of the mirror 50.

The pair of first posts 20 are respectively positioned in a first quadrant I and a third quadrant III so as to be point symmetric with respect to the center of the second post 40 and to be adjacent to the Y axis. The pair of connection electrodes 13 are arranged on the substrate 10 so as to each contact one end of the first posts 20 on the basis of the center of the second post 40.

Most of the base electrodes 11 are positioned in the second quadrant II and the fourth quadrant IV. Here, the pair of base electrodes 11 may be arranged so as to be point symmetric with respect to the second post 40 or so as to be asymmetric with respect to the second post 40. In particular, when the base electrodes 11 are arranged to be asymmetric with respect to the second post, it is possible to improve the straightness of a rotation path.

The horizontal supporting plate 31 is arranged so that the center of the width thereof is disposed on the X axis. The second post 40 is position at a position in which the X axis meets the Y axis. The springs 33 respectively arranged in the first quadrant I and the third quadrant III connect the side surfaces of both ends of the horizontal supporting plate 31 to the upper ends of the first posts 20.

Here, the first posts 20 are formed to be relatively lower than the second post 40 so that the mirror 50 does not contact the substrate 10 and the supporting plate 30. Therefore, before the mirror 50 contacts the substrate 10 and the supporting plate 30, the maximum displacement point of the supporting plate 30 contacts the substrate 10. Accordingly, it is possible to prevent damage and misoperation of the mirror 50 due to contact with the substrate 10 or supporting plate 30.

In the micromirror device, the plurality of first posts 20, electrodes 15, supporting plates 30, second posts 40, and mirrors 50 are arranged on the substrate 10 in a two-dimensional array structure.

The operation of the micromirror device according to the embodiment of the present invention will be described with reference to FIGS. 6 and 7.

Figure 6:
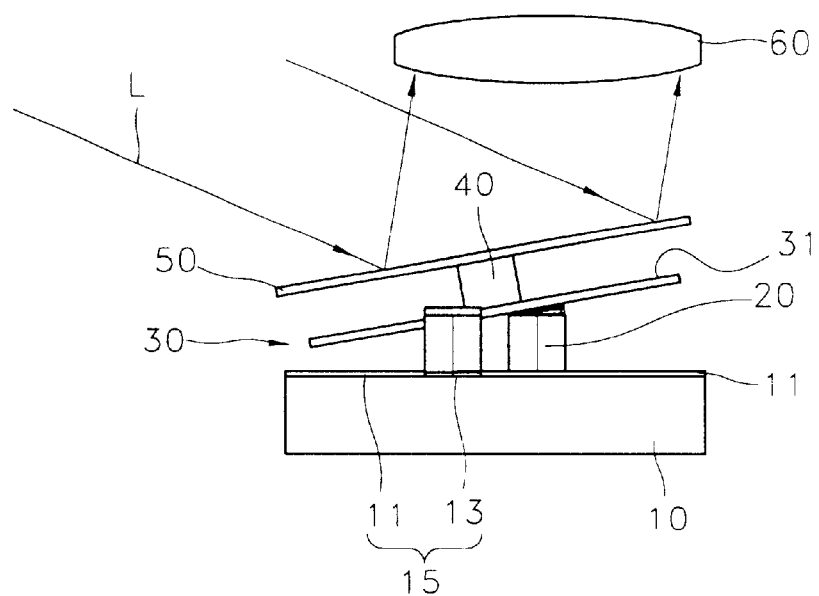
FIGS. 6 and 7 are schematic sectional views for describing the operation of the micromirror device for the image display apparatus according to the embodiment of the present invention.
Figure 7:
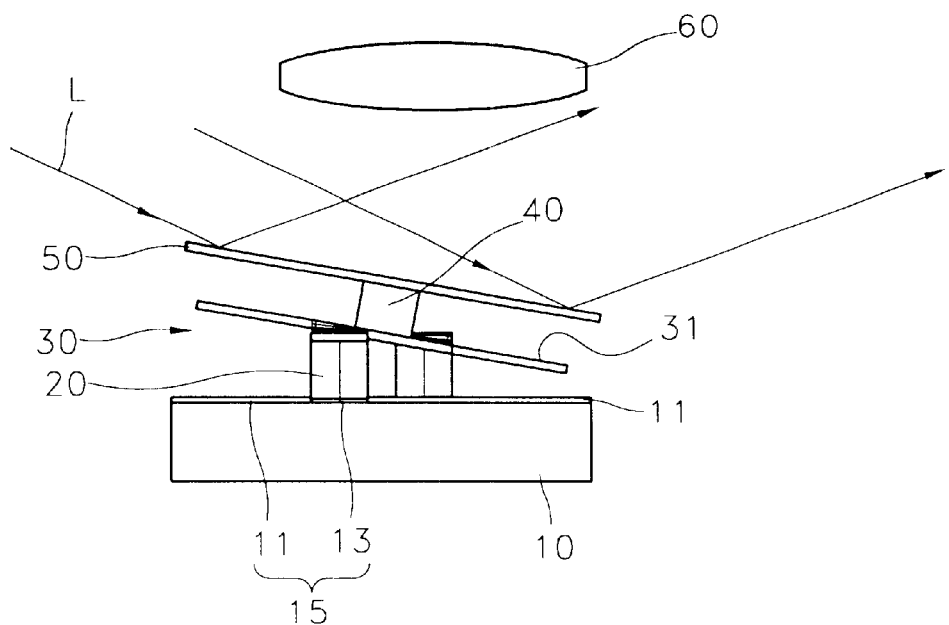

As shown in FIGS. 6 and 7, the mirror 50 is tilted due to an electrostatic attraction generated by a potential difference between the base electrodes 11 and the mirror 50. Namely, a rotation moment is loaded downward on one spring. A rotating moment is loaded upward on the other spring. Therefore, the springs 33 are elastically deformed and the mirror 50 is tilted to the point where the restoring force of the springs 33 and the electrostatic attraction are in equilibrium. The tilt angle and the direction of the mirror 50 are determined according to whether voltages are applied to the base electrode 11.

Therefore, as shown in FIG. 6, when the mirror 50 is arranged to be tilted, incident light is incident on a projection lens 60. When the mirror 50 is arranged as shown in FIG. 7, the incident light is not incident on the projection lens 60.

Since the traveling path of light is determined by rotating the mirror using the rotation moment of the supporting plate in the micromirror device according to the present invention having the above structure, it is easy to arrange the optical system such as the projection lens and diffraction hardly occurs. Therefore, screen contrast and light utilization efficiency are improved.

What is claimed is:

1. A micromirror device for an image display apparatus, comprising:

a substrate;

a pair of first posts protrusively formed on an upper surface of the substrate so as to be separated from each other by a predetermined distance;

electrodes formed on the substrate;

a supporting plate supported by the first posts and rotatably arranged using a portion supported by the first posts as a hinge point;

a second post protrusively formed on the supporting plate; and a mirror supported by the second post for reflecting light incident on one surface thereof, wherein a slope of the mirror can be controlled by an electrostatic attraction between the electrodes and the mirror, and wherein the first posts are formed relatively lower than the second post so that the supporting plate rotates to a maximum displacement point at which the supporting plate contacts the substrate without the edges of the mirror contacting the substrate or the supporting plate so that the mirror is prevented from contacting the substrate or the supporting plate.

2. A micromirror device for an image display apparatus, comprising:

a substrate;

a pair of first posts protrusively formed on an upper surface of the substrate so as to be separated from each other by a predetermined distance;

electrodes formed on the substrate;

a supporting plate supported by the first posts and rotatably arranged using a portion supported by the first posts as a hinge point;

a second post protrusively formed on the supporting plate; and a mirror supported by the second post for reflecting light incident on one surface thereof, wherein a slope of the mirror can be controlled by an electrostatic attraction between the electrodes and the mirror, and wherein the electrodes comprise:

a pair of base electrodes arranged on the substrate, separated from each other by a predetermined distance; and a connection electrode formed on the substrate, contacting one end of a corresponding one of the first posts, for applying a voltage to the mirror.

3. A micromirror device for an image display apparatus, comprising:

a substrate;

a plurality of first posts disposed on an upper surface of said substrate so as to be separated from each other by a predetermined distance;

electrodes formed on said substrate;

a supporting plate supported by said plurality of first posts, said supporting plate having a support portion and a plurality of elastic portions in which at least one of said plurality of elastic portions is length-wise extended in a substantially straight line for connecting said support portion to at least one of said plurality of first posts;

a second post disposed on said support portion of said supporting plate; and a rotatable mirror supported by said second post for reflecting light incident on one surface thereof, wherein the rotation of said mirror is controlled by an electrostatic attraction between said electrodes and said mirror, and wherein the length-wise extension of said at least one of said elastic portions is in a direction which is transverse to a rotating axis of said mirror.

4. The micromirror device of claim 3, wherein the first posts are formed relatively lower than the second post so that the supporting plate rotates to a maximum displacement point at which the supporting plate contacts the substrate without the edges of the mirror contacting the substrate or the supporting plate so that the mirror is prevented from contacting the substrate or the supporting plate.

5. The micromirror device of claim 3, wherein the electrodes comprise:

a pair of base electrodes arranged on the substrate, separated from each other by a predetermined distance; and a connection electrode formed on the substrate, contacting one end of a corresponding one of the first posts, for applying a voltage to the mirror.

6. The micromirror device of claim 3, wherein said plurality of elastic portions comprises:

a pair of springs elastically deformed by a mutual electrostatic attraction between the mirror and the electrodes for connecting a pair of the first posts to both ends of the supporting plate, wherein rotation moments in opposite directions are loaded on the pair of springs when the mirror is tilted upward and downward due to the electrostatic attraction.

7. The micromirror device of claim 6, wherein the first posts are formed relatively lower than the second post so that the supporting plate rotates to a maximum displacement point at which the supporting plate contacts the substrate without the edges of the mirror contacting the substrate or the supporting plate so that the mirror is prevented from contacting the substrate or the supporting plate.

8. The micromirror device of claim 6, wherein the electrodes comprise:

a pair of base electrodes arranged on the substrate, separated from each other by a predetermined distance; and a connection electrode formed on the substrate, contacting one end of a corresponding one of the first posts, for applying a voltage to the mirror.

9. A micromirror device for an image display apparatus, comprising:

a substrate;

a plurality of first posts disposed on an upper surface of said substrate so as to be separated from each other by a predetermined distance;

electrodes formed on said substrate;

a supporting plate supported by said plurality of first posts, said supporting plate having a support portion and a plurality of elastic portions in which at least one of said plurality of elastic portions is length-wise extended in a substantially straight line for connecting said support portion to at least one of said plurality of first posts;

a second post disposed on said support portion of said supporting plate; and a rotatable mirror supported by said second post for reflecting light incident on one surface thereof, wherein the rotation of said mirror is controlled by an electrostatic attraction between said electrodes and said mirror, and wherein at least one pair of said first posts, connected to said support portion via said elastic portions, are disposed on a straight line which is transverse to a rotating axis of said mirror.

10. The micromirror device of claim 9, wherein the first posts are formed relatively lower than the second post so that the supporting plate rotates to a maximum displacement point at which the supporting plate contacts the substrate without the edges of the mirror contacting the substrate or the supporting plate so that the mirror is prevented from contacting the substrate or the supporting plate.

11. The micromirror device of claim 9, wherein the electrodes comprise:

a pair of base electrodes arranged on the substrate, separated from each other by a predetermined distance; and a connection electrode formed on the substrate, contacting one end of a corresponding one of the first posts, for applying a voltage to the mirror.

12. The micromirror device of claim 9, wherein said plurality of elastic portions comprises:

a pair of springs elastically deformed by a mutual electrostatic attraction between the mirror and the electrodes for connecting the at least one pair of first posts to both ends of the supporting plate, wherein rotation moments in opposite directions are loaded on the pair of springs when the mirror is tilted upward and downward due to the electrostatic attraction.

13. The micromirror device of claim 12, wherein the first posts are formed relatively lower than the second post so that the supporting plate rotates to a maximum displacement point at which the supporting plate contacts the substrate without the edges of the mirror contacting the substrate or the supporting plate so that the mirror is prevented from contacting the substrate or the supporting plate.

14. The micromirror device of claim 12, wherein the electrodes comprise:
a pair of base electrodes arranged on the substrate, separated from each other by a predetermined distance; and
a connection electrode formed on the substrate, contacting one end of a corresponding one of the first posts, for applying a voltage to the mirror.

15. A micromirror device for an image display apparatus, comprising:
a substrate;
a plurality of first posts disposed on an upper surface of said substrate so as to be separated from each other by a predetermined distance;
electrodes formed on said substrate;
a supporting plate supported by said plurality of first posts, said supporting plate having a rotatable support portion and a plurality of elastic portions in which at least one of said plurality of elastic portions is lengthwise extended in a substantially straight line for connecting said support portion to at least one of said plurality of first posts, wherein a rotational movement of said support portion causes said elastic portions to deform;
a second post disposed on said support portion of said supporting plate; and
a rotatable mirror supported by said second post for reflecting light incident on one surface thereof,
wherein the rotation of said mirror and said support portion is controlled by an electrostatic attraction between said electrodes and said mirror, and wherein said extension is in a direction which is transverse to a rotating axis of said mirror.

16. The micromirror device of claim 15, wherein the first posts are formed relatively lower than the second post so that the supporting plate rotates to a maximum displacement point at which the supporting plate contacts the substrate without the edges of the mirror contacting the substrate or the supporting plate so that the mirror is prevented from contacting the substrate or the supporting plate.

17. The micromirror device of claim 15, wherein the electrodes comprise:
a pair of base electrodes arranged on the substrate, separated from each other by a predetermined distance; and
a connection electrode formed on the substrate, contacting one end of a corresponding one of the first posts, for applying a voltage to the mirror.

18. The micromirror device of claim 15, wherein said plurality of elastic portions comprises:
a pair of springs elastically deformed by a mutual electrostatic attraction between the mirror and the electrodes for connecting a pair of the first posts to both ends of the supporting plate, wherein rotation moments in opposite directions are loaded on the pair of springs when the mirror is tilted upward and downward due to the electrostatic attraction.

19. The micromirror device of claim 18, wherein the first posts are formed relatively lower than the second post so that the supporting plate rotates to a maximum displacement point at which the supporting plate contacts the substrate without the edges of the mirror contacting the substrate or the supporting plate so that the mirror is prevented from contacting the substrate or the supporting plate.

20. The micromirror device of claim 18, wherein the electrodes comprise:
a pair of base electrodes arranged on the substrate, separated from each other by a predetermined distance; and
a connection electrode formed on the substrate, contacting one end of a corresponding one of the first posts, for applying a voltage to the mirror.

21. A micromirror device for an image display apparatus, comprising:
a substrate;
a plurality of first posts disposed on an upper surface of said substrate so as to be separated from each other by a predetermined distance;
electrodes formed on said substrate;
a supporting plate supported by said plurality of first posts, said supporting plate having a support portion and a plurality of elastic portions in which at least one of said plurality of elastic portions is extended to connect said support portion to at least one of said plurality of first posts;
a second post disposed on said support portion of said support plate; and
a rotatable mirror supported by said second post for reflecting light incident on one surface thereof,
wherein the rotation of said mirror is controlled by an electrostatic attraction between said electrodes and said mirror, and wherein said extension is in a direction which is transverse to a rotating axis of said mirror.

22. The micromirror device of claim 21, wherein the first posts are formed relatively lower than the second post so that the supporting plate rotates to a maximum displacement point at which the supporting plate contacts the substrate without the edges of the mirror contacting the substrate or the supporting plate so that the mirror is prevented from contacting the substrate or the supporting plate.

23. The micromirror device of claim 21, wherein the electrodes comprise:
a pair of base electrodes arranged on the substrate, separated from each other by a predetermined distance; and
a connection electrode formed on the substrate, contacting one end of a corresponding one of the first posts, for applying a voltage to the mirror.

24. The micromirror device of claim 21, wherein said plurality of elastic portions comprises:
a pair of springs elastically deformed by a mutual electrostatic attraction between the mirror and the electrodes for connecting a pair of the first posts to both ends of the supporting plate,
wherein rotation moments in opposite directions are loaded on the pair of springs when the mirror is tilted upward and downward due to the electrostatic attraction.

25. The micromirror device of claim 21, wherein the first posts are formed relatively lower than the second post so that the supporting plate rotates to a maximum displacement point at which the supporting plate contacts the substrate without the edges of the mirror contacting the substrate or the supporting plate so that the mirror is prevented from contacting the substrate or the supporting plate.

26. The micromirror device of claim 21, wherein the electrodes comprise:
   a pair of base electrodes arranged on the substrate, separated from each other by a predetermined distance; and
   a connection electrode formed on the substrate, contacting one end of a corresponding one of the first posts, for applying a voltage to the mirror.

27. A micromirror device for an image display apparatus, comprising:
   a substrate;
   a plurality of first posts disposed on an upper surface of said substrate so as to be separated from each other by a predetermined distance;
   electrodes formed on said substrate;
   a supporting plate supported by said plurality of first posts, said supporting plate having a rotatable support portion and a plurality of elastic portions in which at least one of said plurality of elastic portions is lengthwise extended in a substantially straight line for connecting said support portion to at least one of said plurality of first posts, wherein said at least one of said elastic portions is not subject to a twisting force by the rotation of said support portion;
   a second post disposed on said support portion of said supporting plate; and
   a rotatable mirror supported by said second post for reflecting light incident on one surface thereof,
   wherein the rotation of said mirror and said support portion is controlled by an electrostatic attraction between said electrodes and said mirror.

28. The micromirror device of claim 27, wherein the first posts are formed relatively lower than the second post so that the supporting plate rotates to a maximum displacement point at which the supporting plate contacts the substrate without the edges of the mirror contacting the substrate or the supporting plate so that the mirror is prevented from contacting the substrate or the supporting plate.

29. The micromirror device of claim 27, wherein the electrodes comprise:
   a pair of base electrodes arranged on the substrate, separated from each other by a predetermined distance; and
   a connection electrode formed on the substrate, contacting one end of a corresponding one of the first posts, for applying a voltage to the mirror.

30. The micromirror device of claim 27, wherein said plurality of elastic portions comprises:
   a pair of springs elastically deformed by a mutual electrostatic attraction between the mirror and the electrodes for connecting a pair of the first posts to both ends of the supporting plate,
   wherein rotation moments in opposite directions are loaded on the pair of springs when the mirror is tilted upward and downward due to the electrostatic attraction.

31. The micromirror device of claim 30, wherein the first posts are formed relatively lower than the second post so that the supporting plate rotates to a maximum displacement point at which the supporting plate contacts the substrate without the edges of the mirror contacting the substrate or the supporting plate so that the mirror is prevented from contacting the substrate or the supporting plate.

32. The micromirror device of claim 30, wherein the electrodes comprise:
   a pair of base electrodes arranged on the substrate, separated from each other by a predetermined distance; and
   a connection electrode formed on the substrate, contacting one end of a corresponding one of the first posts, for applying a voltage to the mirror.

33. A micromirror device for an image display apparatus, comprising:
   a substrate;
   a plurality of first posts disposed on an upper surface of said substrate so as to be separated from each other by a predetermined distance;
   electrodes formed on said substrate;
   a supporting plate supported by said plurality of first posts, said supporting plate having a support portion and a plurality of elastic portions for connecting said support portion to at least one of said plurality of first posts, wherein each one of said plurality of elastic portions is connected to a corresponding one of said plurality of first posts;
   a second post disposed on said support portion of said supporting plate; and
   a rotatable mirror supported by said second post for reflecting light incident on one surface thereof,
   wherein the rotation of said mirror is controlled by an electrostatic attraction between said electrodes and said mirror, and wherein at least one of said plurality of elastic portions is extended in a direction which is transverse to a rotating axis of said mirror.

34. The micromirror device of claim 33, wherein the first posts are formed relatively lower than the second post so that the supporting plate rotates to a maximum displacement point at which the supporting plate contacts the substrate without the edges of the mirror contacting the substrate or the supporting plate so that the mirror is prevented from contacting the substrate or the supporting plate.

35. The micromirror device of claim 33, wherein the electrodes comprise:
   a pair of base electrodes arranged on the substrate, separated from each other by a predetermined distance; and
   a connection electrode formed on the substrate, contacting one end of a corresponding one of the first posts, for applying a voltage to the mirror.

36. The micromirror device of claim 33, wherein said plurality of elastic portions comprises:
   a pair of springs elastically deformed by a mutual electrostatic attraction between the mirror and the electrodes for connecting a pair of the first posts to both ends of the supporting plate,
   wherein rotation moments in opposite directions are loaded on the pair of springs when the mirror is tilted upward and downward due to the electrostatic attraction.

37. The micromirror device of claim 36, wherein the first posts are formed relatively lower than the second post so that the supporting plate rotates to a maximum displacement point at which the supporting plate contacts the substrate without the edges of the mirror contacting the substrate or the supporting plate so that the mirror is prevented from contacting the substrate or the supporting plate.

38. The micromirror device of claim 36, wherein the electrodes comprise:
   a pair of base electrodes arranged on the substrate, separated from each other by a predetermined distance; and
   a connection electrode formed on the substrate, contacting one end of a corresponding one of the first posts, for applying a voltage to the mirror.

* * * * *